United States Patent [19]
Music

[11] 3,748,891
[45] July 31, 1973

[54] PRESSURE STANDARD

[75] Inventor: William A. Music, Los Angeles, Calif.

[73] Assignee: Schwien Engineering, Inc., Pamona, Calif.

[22] Filed: Oct. 4, 1971

[21] Appl. No.: 186,249

[52] U.S. Cl. .................................... 73/4 D, 73/4 V
[51] Int. Cl. ............................................ G01l 27/00
[58] Field of Search ..................... 73/4 D, 4 V, 4 R

[56] References Cited
UNITED STATES PATENTS
3,133,435  5/1964  Lewis, Jr. .............................. 73/4 D
3,272,014  9/1966  Miks et al. ............................. 73/4 D
FOREIGN PATENTS OR APPLICATIONS
744,620  2/1956  Great Britain ........................ 73/4 D OTHER PUBLICATIONS
Publ. "Primary Pressure Standard" by Dynametrics Corp. Tech. Bulletin No. 150 pp. 1–4, Sept. 12, 1960.

Primary Examiner—Richard C. Queisser
Assistant Examiner—Daniel M. Yasich
Attorney—Ford W. Harris, Jr.

[57] ABSTRACT

A standard for gas pressure for checking other standards and for calibrating instruments. A cylinder weight mounted on an air shaft for rotation, means for limiting up and down motion of the cylinder, means for introducing gas under pressure to the air shaft to float the cylinder on the shaft, and means for rotating the cylinder when floating to provide a positive indication of pressure. A standard for use in ambient atmosphere and in a vacuum.

4 Claims, 6 Drawing Figures

INVENTOR.
WILLIAM A. MUSIC
BY HIS ATTORNEYS

HARRIS, KIECH, RUSSELL & KERN

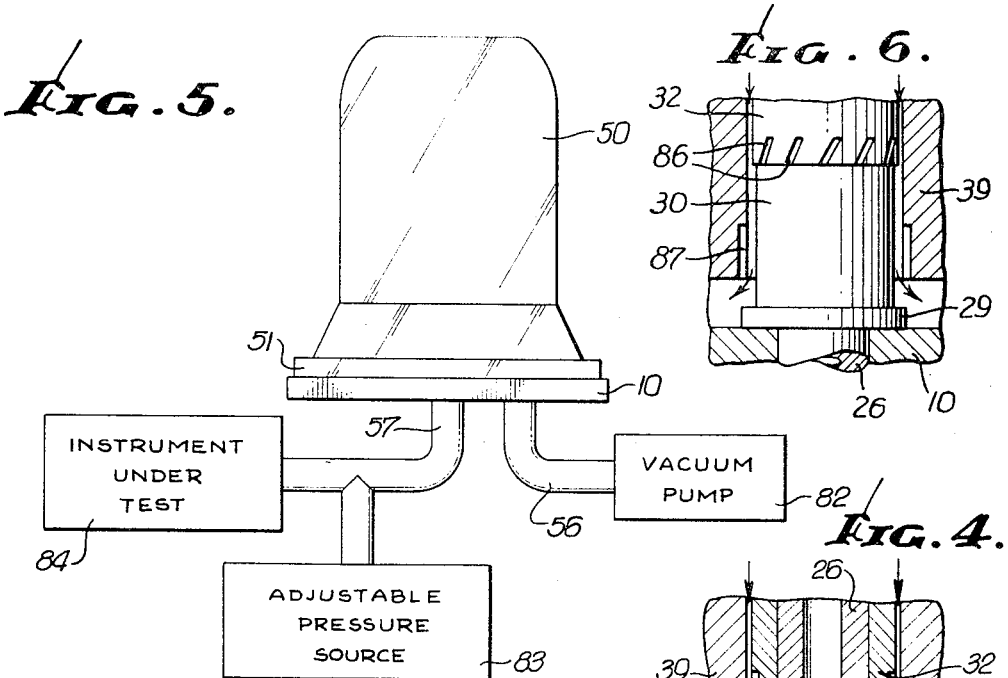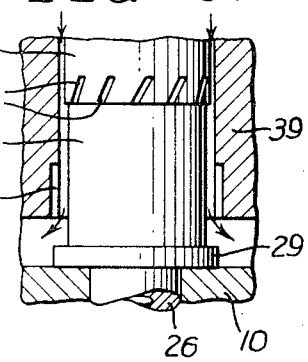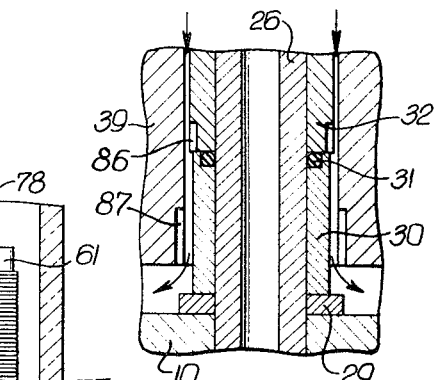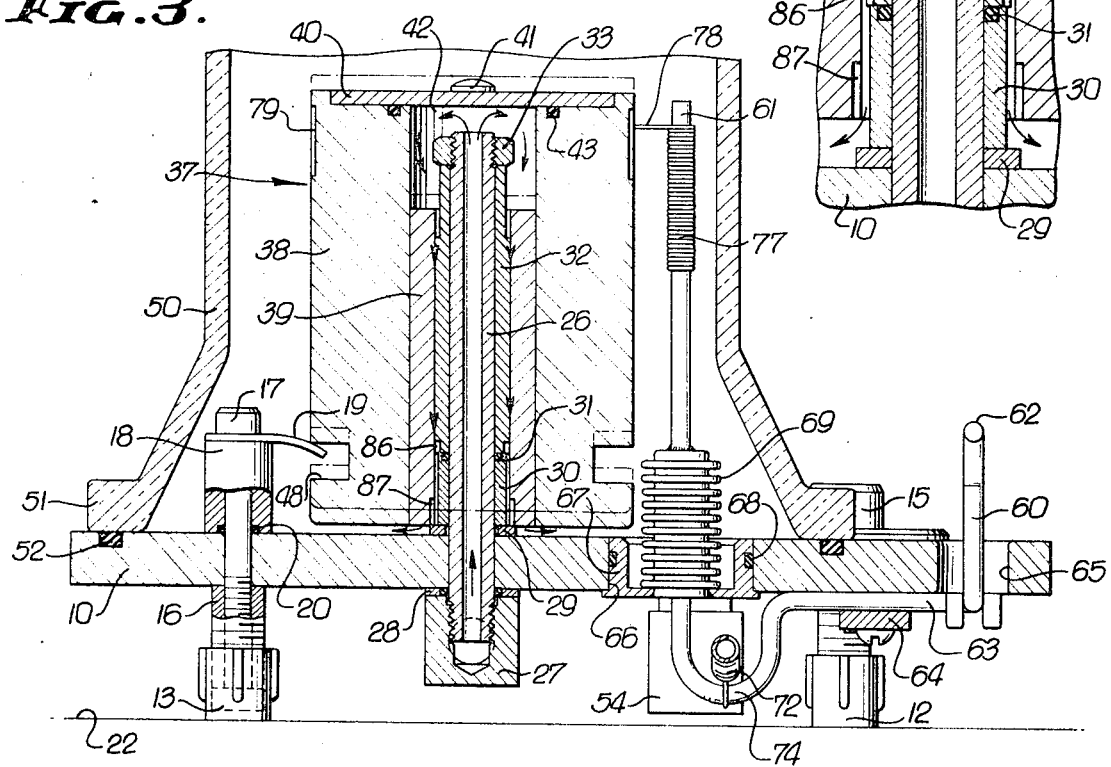

PRESSURE STANDARD

This invention relates to pressure measuring equipment and in particular, to a new and improved standard for calibration of instruments and other standards. Various pressure measuring devices are available ranging from the simple aneroid barometer to the complex precision mercury manometer, with the instrument complexity increasing rapidly with the accuracy of the instrument.

It is an object of the present invention to provide a new and improved pressure standard which is accurate, small and simple, always available and quickly usable to perform a calibration check. A typical instrument may occupy a cubical volume in the order of six inches on a side and be operable at subatmospheric and superatmospheric pressures.

The pressure standard of the invention contemplates an upstanding shaft carried on a base with an air passage for directing a gas under pressure upward through the shaft. A weight in the form of a cylinder is positioned on the shaft for movement up and down and for rotation. Means are provided for limiting vertical movement of the cylinder and for applying a rotational motion to the cylinder. In operation, air flows up through the shaft passage and down between the cylinder and the shaft and, for a particular cylinder and air pressure, the cylinder will float on the shaft between the upper and lower limits. The cylinder is rotated to provide a ready visual indication of the floating condition.

Other objects, advantages, features and results will more fully appear in the course of the following description. The drawings merely show and the description merely describes preferred embodiments of the present invention which are given by way of illustration or example.

In the drawings:

FIG. 3 is an enlarged partial sectional view taken along the line 3—3 of FIG. 2;

FIG. 4 is an enlargd view of a portion of FIG. 3, illustrating certain air passages;

FIG. 5 is a diagram illustrating a typical use of the instrument of FIG. 1; and

FIG. 6 is a view similar to that of FIG. 4 showing the exterior of the upstanding shaft.

Figure 1:
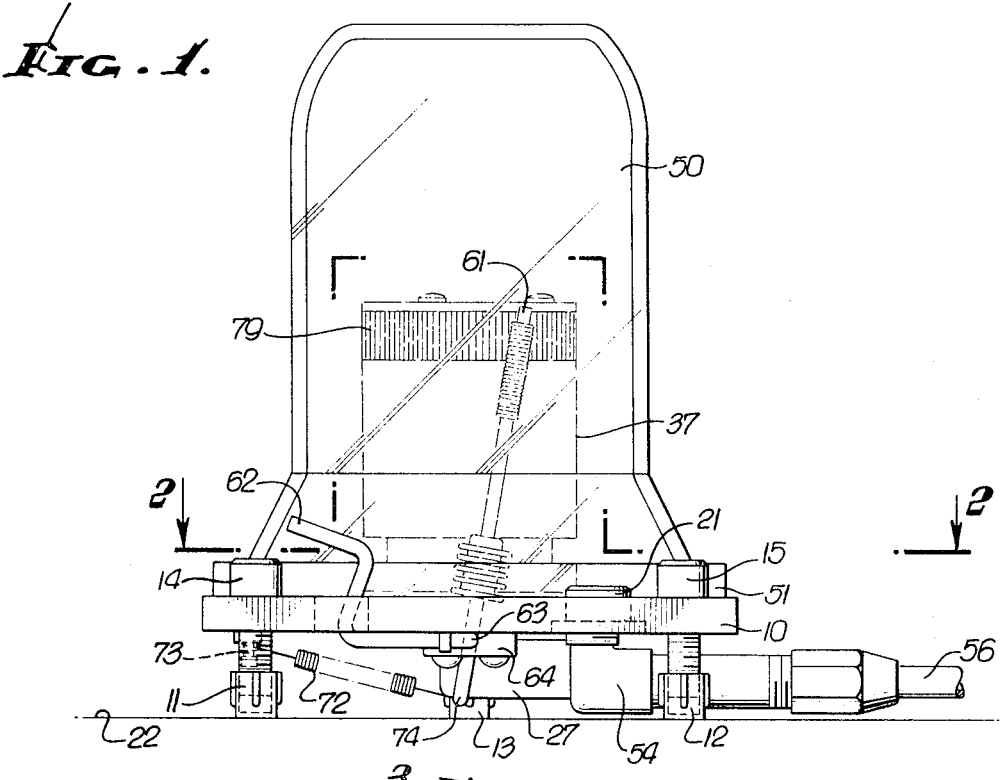
FIG. 1 is a side view of a pressure standard incorporating a preferred embodiment of the present invention.

The instrument includes a base plate 10 resting on feet 11, 12, 13. The feet 11, 12 are carried on screws 14, 15, respectively, which screws pass through threaded openings in the base 10. The foot 13 is carried on a spacer 16 held to the bottom of the base 10 by a screw 17 which also serves to mount another spacer 18 and a finger 19 above the base 10. A pressure seal such as an O-ring 20 may be positioned about the screw 17 in a recess in the spacer 18. A level indicator 21 may be mounted in the base 10, with the feet 11 and 12 being movable vertically on their respective threaded supports for leveling the instrument when resting on a support surface 22.

A tubular shaft 26 is carried in the base 10 and has threaded upper and lower ends. An elbow fitting 27 is threaded on the lower end of the shaft 26 and a pressure seal 28 is provided on the shaft 26 between the fitting 27 and the base 10. A washer 29, a spacer 30, a seal ring 31, and a sleeve 32 are positioned on the shaft 26 above the base 10 and are held in position by a nut 33 engaging the upper end of the shaft.

A cylinder 37 is mounted on the upstanding shaft 26 for movement along the axis of the shaft and for rotation about the axis of the shaft, and includes a tubular body 38 with an inner sleeve 39. The upper end of the body 38 is closed by a cover 40 affixed with screws 41 providing an air spaced 42 at the upper end of the cylinder. A seal ring 43 may be positioned between the body and cover.

The finger 19 projects into a peripheral groove 48 in the body 38 of the cylinder 37. The finger 19 serves as a stop for limiting upward movement of the cylinder by engaging the lower wall of the groove 48. The finger 19 may act similarly to limit downward movement of the cylinder by engaging the upper wall of the groove or, alternatively, downward movement may be limited by engagement of the cylinder sleeve 39 with the shaft washer 29.

A cover 50 may be positioned over the cylinder with the lower flange 51 of the cover resting on the base 10 and engaging a seal ring 52. An elbow fitting 54 may be inserted in a threaded opening 55 in the base 10 providing a flow passage between the interior of the cover 50 and a line 56. The fitting 27 provides a flow passage between the interior of the shaft 26 and another line 57.

A mechanism is provided for applying a rotational force to the cylinder and in the preferred embodiment illustrated, a lever 60 is formed form a length of rod with one end 61 adjacent the cylinder 37 and with the other end 62 remote from the cylinder. A central portion 63 of the lever rides in a groove in a block 64 which in turn is fastened to the underside of the base 10 by suitable screws to provide a pivoting support for the lever. The outer end 62 of the lever passes upward through an opening 65 in the base outside the cover 50 while the inner end 61 passes through an opening 66 within the cover 50. An air seal is provided at the opening 66, comprising a sleeve 67, a seal ring 68, and a flexible bellows 69, with the upper end of the bellows affixed to the lever and with the lower end of the bellows affixed to the sleeve 67. A tension spring 72 is coupled between a pin 73 projecting downward from the base 10 and a loop 74 in the lever for urging the lever to the position shown in FIGS. 1 and 2.

The inner end 61 of the lever may be moved back and forth generally in a plane perpendicular to the axis of the shaft and cylinder by manually pushing downward on the outer end 62 and then releasing the lever, permitting the spring 72 to return the lever to the position of FIG. 1.

Means is provided on the lever for engaging the cylinder and in the preferred embodiment illustrated, a coil spring 77 is pushed onto the lever end 61, with an end 78 of the spring projecting toward the surface of the cylinder 37. A band of knurling 79 may be provided on the cylinder for better engagement with the spring end 78.

In operation, a source of vacuum such as a vacuum pump 82 is connected to the line 56 and another source 83 providing a gas under pressure is connected to the line 57. The instrument 84 which is to be calibrated is also connected to the line 57, as shown in FIG. 5.

The pressure in the line 57, which may be subatmospheric or superatmospheric, is adjusted to an amount which will raise the cylinder from the rest position shown in solid lines in FIG. 3 to the floating position shown in phantom lines. The gas from the source, typically air, flows through the line 56, the fitting 27 and the shaft 26 into the space 42. The gas exerts an upward force on the cylinder 37 acting against the force of gravity acting on the mass of the cylinder. Air flows from the space 42 downward between the shaft sleeve 32 and the cylinder sleeve 39, into the interior of the cover 50 and through the fitting 54 and line 56 to the vacuum source 82. Typically the clearance between the sleeves 32 and 39 is in the order of 0.0003 inches.

If the pressure from the source 83 is slightly less than that required to float the cylinder, the cylinder will be at the lower limit resting on the finger 19 or washer 29. If the pressure from the source is slightly above that required to float the cylinder, the cylinder will be at its upper limit with the finger 19 engaging the bottom wall of the groove 48. In either of these conditions, rotation of the cylinder will be inhibited. However, when the source pressure is equal to that required to float the cylinder, the cylinder will readily rotate with the finger 19 intermediate the walls of the groove 48. The free rotation and the finger position provide visual indications of the condition of the system. A pressure change of 0.0005 inches of mercury will cause the cylinder to move from one limit to the other.

Figure 2:
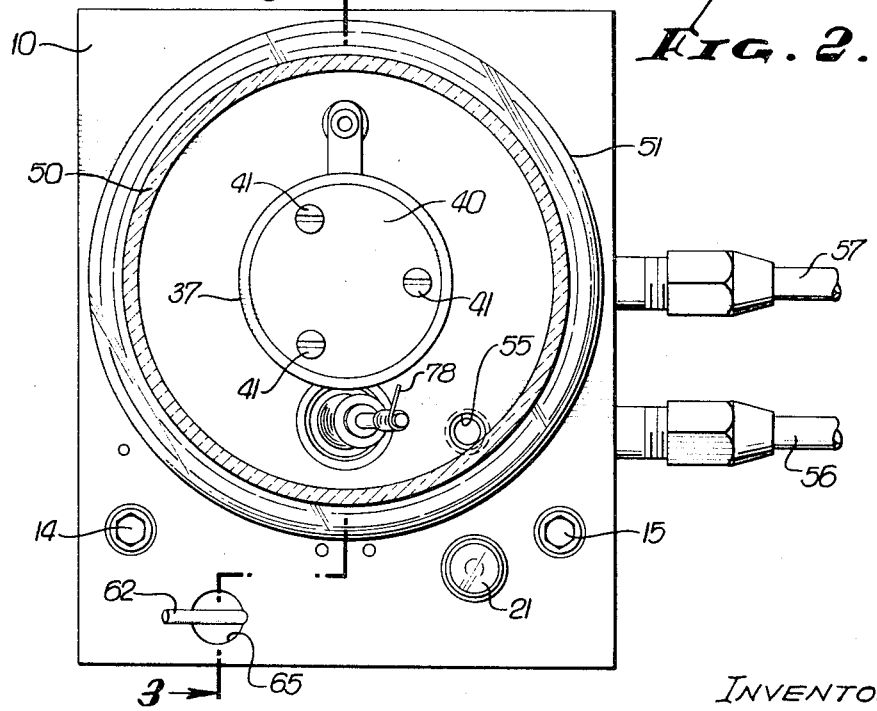
FIG. 2 is a sectional view taken along the line 2—2 of FIG. 1.

The operator performing the calibration can readily adjust the pressure at the source 83 with one hand and apply a rotational force to the cylinder with the other hand by operating the lever end 62. The spring 77 on the inner end of the lever provides a simple and reliable mechanism for spinning the cylinder in one direction. When the lever outer end 62 is manually moved downward and the lever inner end 61 moves to the left as seen in FIGS. 1 and 2, the spring end 78 engages the cylinder surface and tends to wind the spring 77 on the lever. However the spring and lever have no clearance and the spring cannot wind on the lever; hence a driving force is applied to the cylinder. When the lever moves in the opposite direction, the spring end 78 again engages the cylinder and tends to unwind the spring, applying no driving force to the cylinder. One cycle of operation of the lever is sufficient to keep the cylinder spinning for several seconds when the cylinder is floating.

After a pressure standard has been constructed, the specific pressure differential required to float the cylinder at known temperature and pressure is determined for the instrument. Then this instrument can be used as a pressure standard for calibrating instruments and testing other standards at this particular point. In the embodiment illustrated, the instrument is operated with a subatmospheric pressure within the cover 50. The instrument can also be operated at atmospheric pressure by removing the cover 50.

The gas leaving the instrument may be used to provide a rotational torque to spin the cylinder, making it self-rotating when in the floating position. Gas flowing downward between the sleeves 32, 39 enters obliquely positioned notches or slots 86 in the lower end of the sleeve 32. The gas leaves the notches in a swirling pattern, exerting a torque on the cylinder. Similar notches 87 may be provided in the lower end of the sleeve 39 for the same purpose.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. In a pressure standard, the combination of:
 a base including an upstanding shaft having an air passage therethrough:
 a tubular cylinder with a closed upper end and an open lower end and mounted on said shaft for rotation and reciprocation;
 interengaging means on said base and cylinder for limiting upward and downward motion of said cylinder along said shaft between upper and lower limits;
 means for connecting a source of gas under pressure to said shaft passage for gas flow upward through said passage and downward between said shaft and the cylinder, with said cylinder floating on said shaft between said upper and lower limits for a predetermined gas pressure;
 a lever mounted in said base with a lever section disposed adjacent said cylinder;
 means for reciprocating said lever section along a path generally in a plane perpendicular to the axis of rotation of said cylinder; and
 a coil spring carried on said lever at said section, said spring having an end projecting toward the outer surface of said cylinder for engaging said surface as said lever section is reciprocated,
 with engagement of said spring end and cylinder surface tending to wind the coil when the lever is moved in one direction and tending to unwind the coil when the lever is moved in the opposite direction for propelling said cylinder in rotation.

2. A pressure standard as defined in claim 1 in which said interengaging means includes a peripheral groove in said cylinder and a finger mounted on said base and projecting into said groove, with said finger out of engagement with the walls of said groove when said cylinder is floating between the upper and lower limits, and with engagement of said finger with one of said groove walls impeding cylinder rotation.

3. In a pressure standard, the combination of:
 a base including an upstanding shaft having an air passage therethrough;
 a tubular cylinder with a closed upper end and an open lower end and mounted on said shaft for rotation and reciprocation;
 interengaging means on said base and cylinder for limiting upward and downward motion of said cylinder along said shaft between upper and lower limits;
 means for connecting a source of gas under pressure to said shaft passage for gas flow upward through said passage and downward between said shaft and the cylinder, with said cylinder floating on said shaft between said upper and lower limits for a predetermined gas pressure;
 a cover carried on said base and enclosing said cylinder;
 means for connecting a source of vacuum to the interior of said cover for gas flow from the gas source, up through said shaft passage and down between said shaft and cylinder into said cover and to the vacuum source;
a lever having first and second lever sections;
mounting means for mounting said lever in said base with said first section adjacent said cylinder within said cover and said second section remote from said cylinder and outside said cover,
with said mounting means between said first and second sections and including an air seal, and providing for reciprocating said first lever section along a path generally in a plane perpendicular to the axis of rotation of said cylinder by manual actuation of said second section; and
a coil spring carried on said lever at said first section, said spring having an end projecting toward the outer surface of said cylinder for engaging said surface as said lever section is reciprocated,
with engagement of said spring end and cylinder surface tending to wind the coil when the lever is moved in one direction and tending to unwind the coil when the lever is moved in the opposite direction for propelling said cylinder in rotation.

4. A pressure standard as defined in claim 3 in which said mounting means includes:
an air seal comprising a bellows positioned about said lever with one end affixed to the lever and with the other end affixed to the base at an opening for movement of the lever in the opening; and
a member holding said lever to said base adjacent said opening.

* * * * *